United States Patent
Tomisawa et al.

(10) Patent No.: US 9,942,778 B2
(45) Date of Patent: Apr. 10, 2018

(54) VIRTUAL BASE STATION APPARATUS AND COMMUNICATION METHOD

(71) Applicant: Panasonic Intellectual Property Corporation of America, Torrance, CA (US)

(72) Inventors: Yuji Tomisawa, Kanagawa (JP); Naganori Shirakata, Kanagawa (JP); Hiroyuki Motozuka, Kanagawa (JP); Masataka Irie, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/446,892

(22) Filed: Mar. 1, 2017

(65) Prior Publication Data

US 2017/0272959 A1    Sep. 21, 2017

(30) Foreign Application Priority Data

Mar. 16, 2016  (JP) .................................. 2016-052981

(51) Int. Cl.
| | |
|---|---|
| H04B 7/06 | (2006.01) |
| H04W 16/28 | (2009.01) |
| H04L 12/46 | (2006.01) |
| H04B 17/309 | (2015.01) |

(52) U.S. Cl.
CPC .......... *H04W 16/28* (2013.01); *H04B 7/0617* (2013.01); *H04B 7/0632* (2013.01); *H04L 12/4641* (2013.01); *H04B 17/309* (2015.01)

(58) Field of Classification Search
None
See application file for complete search history.

(56) References Cited

U.S. PATENT DOCUMENTS

| | | | | |
|---|---|---|---|---|
| 2013/0053079 | A1* | 2/2013 | Kwun | H04B 7/024 455/509 |
| 2013/0065622 | A1* | 3/2013 | Hwang | H04W 16/28 455/500 |

OTHER PUBLICATIONS

IEEE Computer Society, "Part 11:Wireless LAN Medium Access Control (MAC) and Physical Layer (PHY) Specifications Amendment 3:Enhancements for Very High Throughput in the 60 GHz Band", IEEE Std 802.11ad(TM), Dec. 2012.

* cited by examiner

Primary Examiner — Alejandro Rivero
(74) Attorney, Agent, or Firm — Seed IP Law Group LLP

(57) ABSTRACT

A virtual base station apparatus (virtual AP) formed by a plurality of base station apparatuses (APs) requests a terminal apparatus (STA) to start beamforming training. The terminal apparatus transmits a plurality of first training frames to the virtual base station apparatus. The virtual base station apparatus receives the plurality of first training frames by using the plurality of base station apparatuses, and transmits a plurality of second training frames including information on a training frame received under the best conditions from a first base station apparatus that has received the training frame received under the best conditions to the terminal apparatus. The terminal apparatus receives the plurality of second training frames, and transmits to the virtual base station apparatus a second frame including information on a frame received under the best conditions among the plurality of second received training frames.

10 Claims, 10 Drawing Sheets

VIRTUAL BASE STATION APPARATUS AND COMMUNICATION METHOD

BACKGROUND

1. Technical Field

The present disclosure relates to a virtual base station apparatus and a communication method for performing millimeter-wave band communication using beamforming.

2. Description of the Related Art

In recent years, to ensure a bandwidth of 1 GHz or higher to meet rapidly increasing traffic demands, studies have been made on the employment of small base station apparatuses that perform communication by using millimeter wave bands. For example, a communication system (also sometimes referred to as a heterogeneous network) is conceived in which a plurality of small base station apparatuses are located within a communication area of a base station apparatus that performs communication by using microwave bands.

Such small base station apparatuses use millimeter wave bands. Communication using the millimeter wave bands causes propagation loss greater than that using the microwave bands, and it is difficult to extend the arrival range of radio waves.

One of the methods for reducing propagation loss, increasing the communication speed, increasing the cell area, and so on is directional control (beamforming) for a base station apparatus and a terminal (also sometimes referred to as a "terminal apparatus" or "station (STA)") by using a plurality of antenna elements (antenna array). In transmission using directional control, a transmitting apparatus (base station apparatus or terminal) directs radio waves toward a communication partner, thereby allowing the radio waves to reach farther than in non-directional transmission. Thus, the cell area that is covered can be extended. In addition, since communication using directional control improves the signal to interference-plus-noise power ratio (SINR), the application of a modulation scheme and coding rate with high frequency use efficiency results in high transmission speed communication (see, for example, Institute of Electrical and Electronics Engineers (IEEE) 802.11ad-2012 Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications Amendment 3: Enhancements for Very High Throughput in the 60 GHz Band).

Directional control requires a base station apparatus to perform beamforming training for directivity matching for each terminal to be connected. In the beamforming training, the base station apparatus needs to have directivity (scan) over a wider angle to increase the cell area that is covered, and the time required for the beamforming training becomes overhead, resulting in a reduction in frequency use efficiency.

SUMMARY

One non-limiting and exemplary embodiment facilitates providing a base station apparatus and a communication method that enable an increase in cell area that is covered by a millimeter-wave network and a reduction in the time required for beamforming training.

In one general aspect, the techniques disclosed here feature a virtual base station apparatus for performing millimeter-wave band communication with a terminal apparatus by using beamforming. The virtual base station apparatus includes a plurality of base station apparatuses. Each of the plurality of base station apparatuses includes a transmitter, which, in operation, transmits a plurality of first training frames to the terminal apparatus, a receiver, which, in operation, receives a plurality of second training frames transmitted from the terminal apparatus, and a communication device, which, in operation, communicates beamforming control information among the plurality of base station apparatuses. The plurality of base station apparatuses include a first base station apparatus. The receiver of the first base station apparatus, in operation, receives the plurality of second training frames, the plurality of second training frames including information on a first training frame having a best reception quality among the plurality of first training frames received by the terminal apparatus. The communication device of the first base station apparatus, in operation, transmits the information on the first training frame having the best reception quality, as the beamforming control information, to other base station apparatuses of the plurality of base station apparatuses. The transmitter of the first base station apparatus, in operation, transmits a third frame to the terminal apparatus, the third frame including information on a second training frame having a best reception quality among the plurality of received second training frames.

It should be noted that general or specific embodiments may be implemented as a system, a method, an integrated circuit, a computer program, a storage medium, or any selective combination thereof.

According to an embodiment of the present disclosure, a reduction in the time required for beamforming training in a millimeter-wave network is achievable.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

1. Underlying Knowledge Forming Basis of Embodiment of the Present Disclosure

First, underlying knowledge forming the basis of an embodiment of the present disclosure will be described.

In directional control, when it is difficult for a base station apparatus to know the direction in which a terminal is present, it is difficult for the base station apparatus to transmit a signal with directivity directed in the direction of the terminal.

To address this difficulty, a method for a typical millimeter-wave network has been proposed in which a range that is a cell area is divided into subranges in accordance with the width (angle) of directivity and a base station apparatus sequentially transmits to each of the subranges a signal whose directivity is switched.

Figure 1:
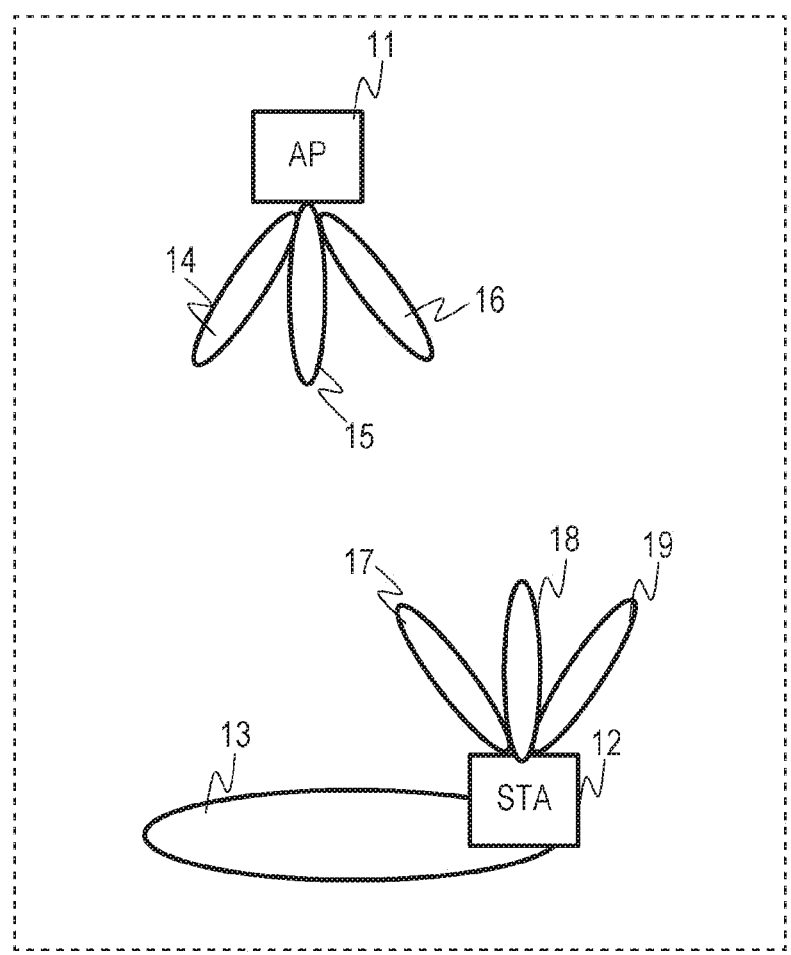
FIG. 1 illustrates an example of a millimeter-wave communication system.

FIG. 1 illustrates an example of a millimeter-wave communication system. The millimeter-wave communication system illustrated in FIG. 1 includes a millimeter-wave base station apparatus (hereinafter sometimes referred to also as an "access point (AP)") 11 and a millimeter-wave terminal (hereinafter sometimes referred to also as a "station (STA)") 12, and the AP 11 has a communication coverage area 13. Radio wave directions (hereinafter sometimes referred to also as "beams") which are formed by antennas of the AP 11 are indicated by numerals 14, 15, and 16. The AP 11 is capable of forming and switching, for example, N beams, where N is an integer greater than or equal to 1. In FIG. 1, the N beams are each assigned a number (hereinafter sometimes referred to also as a "beam ID"). In FIG. 1, the radio wave direction (beam) 14 is assigned beam ID=1, the radio wave direction (beam) 15 is assigned beam ID=n, and the radio wave direction (beam) 16 is assigned beam ID=N. Likewise, the STA 12 is also capable of forming and switching K beams, where K is an integer greater than or equal to 1. In FIG. 1, a radio wave direction (beam) 17 is assigned beam ID=1, a radio wave direction (beam) 18 is assigned beam ID=k, and a radio wave direction (beam) 19 is assigned beam ID=K. The communication coverage area 13 is a range that the beams 14 to 16 reach.

If the STA 12 is located within the range of the communication coverage area 13, the AP 11 can communicate with the STA 12. To improve transmission quality, the AP 11 and the STA 12 need to select a beam pair to produce the best transmission quality between the AP 11 and the STA 12.

Figure 2:
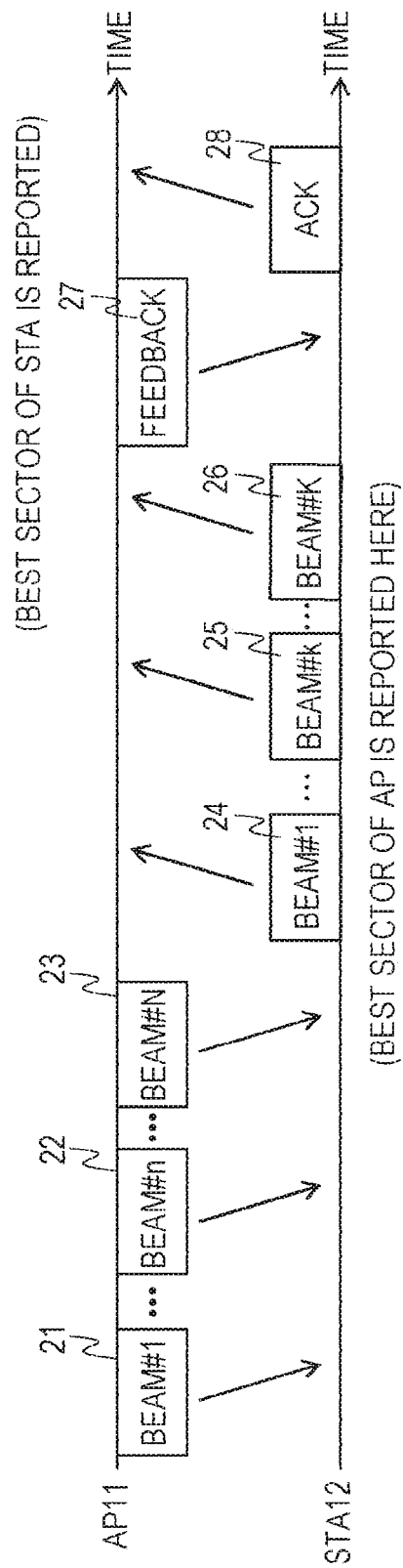
FIG. 2 illustrates an example of beamforming training in the millimeter-wave communication system.

Accordingly, a transmitter of a base station apparatus performs beamforming training at a timing illustrated in FIG. 2. FIG. 2 is a timing chart illustrating an example of beamforming training in the millimeter-wave communication system. In FIG. 2, training frames 21, 22, and 23, which are transmitted from the AP 11, training frames 24, 25, and 26, which are transmitted from the STA 12, a feedback frame 27, which is transmitted from the AP 11, and an acknowledge (ACK) frame 28, which is transmitted from the STA 12, are illustrated.

First, the AP 11 switches beams and transmits the training frames 21, 22, and 23. For example, the AP 11 transmits the training frame 21 by using beam ID=1 (i.e., the beam 14), the training frame 22 by using beam ID=n (i.e., the beam 15), and the training frame 23 by using beam ID=N (i.e., the beam 16). Each training frame includes information on the beam ID used for the transmission of the training frame and information on the number of remaining frames indicating the number of frames left to be transmitted after the transmission of the training frame.

Upon correct receipt of the training frames 21, 22, and 23 (without error), the STA 12 stores the reception qualities (such as the receive levels, the signal-to-noise ratios (SNRs), or the signal-to-interference-noise ratios (SINRs)) of the received training frames 21, 22, and 23 and the information stored in the training frames 21, 22, and 23, namely, the information on the beam IDs and the numbers of remaining frames. Although there may be a training frame that is difficult to correctly receive depending on the beam direction of the AP 11 or the position or orientation of the STA 12, information on the number of remaining frames which is obtained from a correctly received training frame allows the STA 12 to know the period for transmission of the training frames (hereinafter referred to as the "training frame transmission period") from the AP 11.

After detecting the end of the training frame transmission period, the STA 12 performs training of the beams transmitted from the STA 12 in a similar way.

The STA 12 switches beams and transmits the training frames 24, 25, and 26. For example, the STA 12 transmits the training frame 24 by using beam ID=1 (i.e., the beam 17), the training frame 25 by using beam ID=k (i.e., the beam 18), and the training frame 26 by using beam ID=K (i.e., the beam 19). Each training frame includes information on the beam ID used for the transmission of the training frame and information on the number of remaining frames indicating the number of frames left to be transmitted after the training frame. In addition, the training frames 24, 25, and 26 also include information for notifying the AP 11 of a beam ID included in a training frame determined to have been received with the best quality among the training frames 21, 22, and 23 received by the STA 12 (the beam ID is hereinafter sometimes referred to also as the "best sector of the AP").

Upon correct receipt of the training frames 24, 25, and 26 from the STA 12 (without error), the AP 11 stores the reception qualities (such as the receive levels, the SNRs, or the SINRs) of the received training frames 24, 25, and 26 and the information stored in the training frames 24, 25, and 26, namely, the information on the beam IDs and the numbers of remaining frames. Further, the AP 11 selects a beam ID to provide the best reception quality when transmission is performed from the AP 11 to the STA 12, by using the beam ID reported by the STA 12, which indicates the best sector of the AP 11, and uses the beam with the selected beam ID for subsequent communication with the STA 12.

The information on the numbers of remaining frames which is obtained from the correctly received training frames 24, 25, and 26 allows the AP 11 to know the training frame transmission period from the STA 12.

After detecting the end of the training frame transmission period, the AP 11 reports to the STA 12 a beam ID included in a training frame determined to have been received with the best quality among the training frames 24, 25, and 26 received by the AP 11 (the beam ID is hereinafter sometimes referred to also as the "best sector of the STA") by using the feedback frame 27.

The STA 12 receives the feedback frame 27 and selects a beam ID to provide the best reception quality when transmission is performed from the STA 12 to the AP 11, by using the reported beam ID which indicates the best sector of the STA 12, and uses the beam with the selected beam ID for subsequent communication with the AP 11.

The STA 12 reports a response indicating a receipt of the feedback frame 27 to the AP 11 by using the ACK frame 28. Thus, the beamforming training ends.

In a case where the base station apparatus (the AP 11) and the terminal (the STA 12) are both capable of directing directivity over a wide range (for example, 180° to 360°), it is possible to maintain communication even if the attitude or orientation of the terminal changes. To direct directivity over a wide range (allocate the beam over a wide range) in this manner, an antenna array having a large number of elements (for example, 16 to 64 elements) is needed.

However, an antenna array having a large number of elements increases the circuit scale of a wireless unit, and it is difficult to incorporate an antenna array having a large number of elements in a terminal for which compactness and low power consumption are required. Therefore, the range of the angle of emission of radio waves transmitted from the terminal is narrow, and a change in the attitude or orientation of the terminal also largely changes the communication-available area. Accordingly, it is difficult to maintain communication with a single base station apparatus.

To address this difficulty, a technology has been proposed for arranging a plurality of antennas of a base station apparatus in a distributed manner so as to increase the communication-available area of the base station apparatus to cover a wide range. This technology will be described hereinafter.

Figure 3:
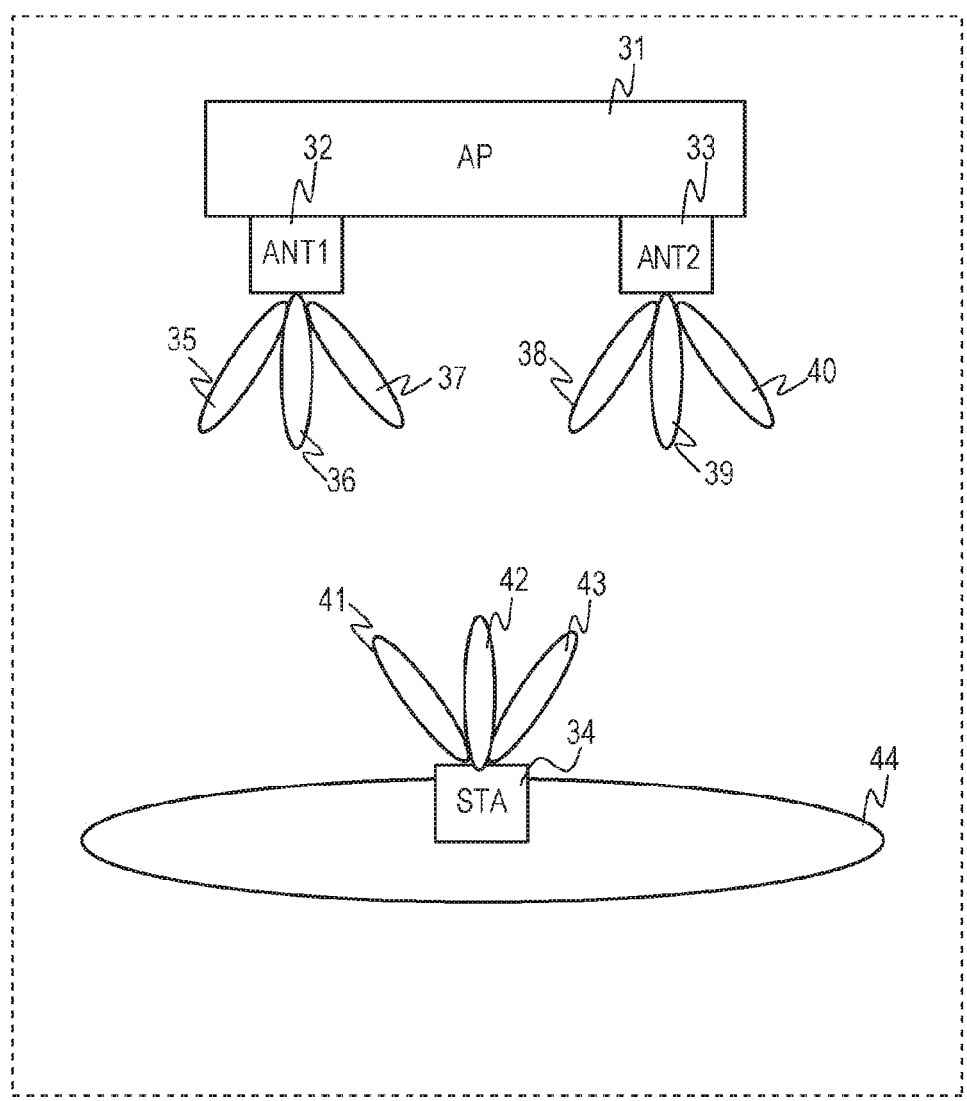
FIG. 3 illustrates an example of a millimeter-wave communication system that includes a base station apparatus including a plurality of antennas.

FIG. 3 illustrates an example of a millimeter-wave communication system that includes an AP 31 including a plurality of antennas. The AP 31 includes an antenna 32 (ANT1) and an antenna 33 (ANT2) and switches between the antenna 32 (ANT1) and the antenna 33 (ANT2) for use. The ANT1 uses beams 35, 36, and 37 and the ANT2 uses beams 38, 39, and 40, thereby allowing the AP 31 to cover a communication area 44. A STA 34 establishes a connection with the AP 31 by using beams 41, 42, and 43.

Figure 4:
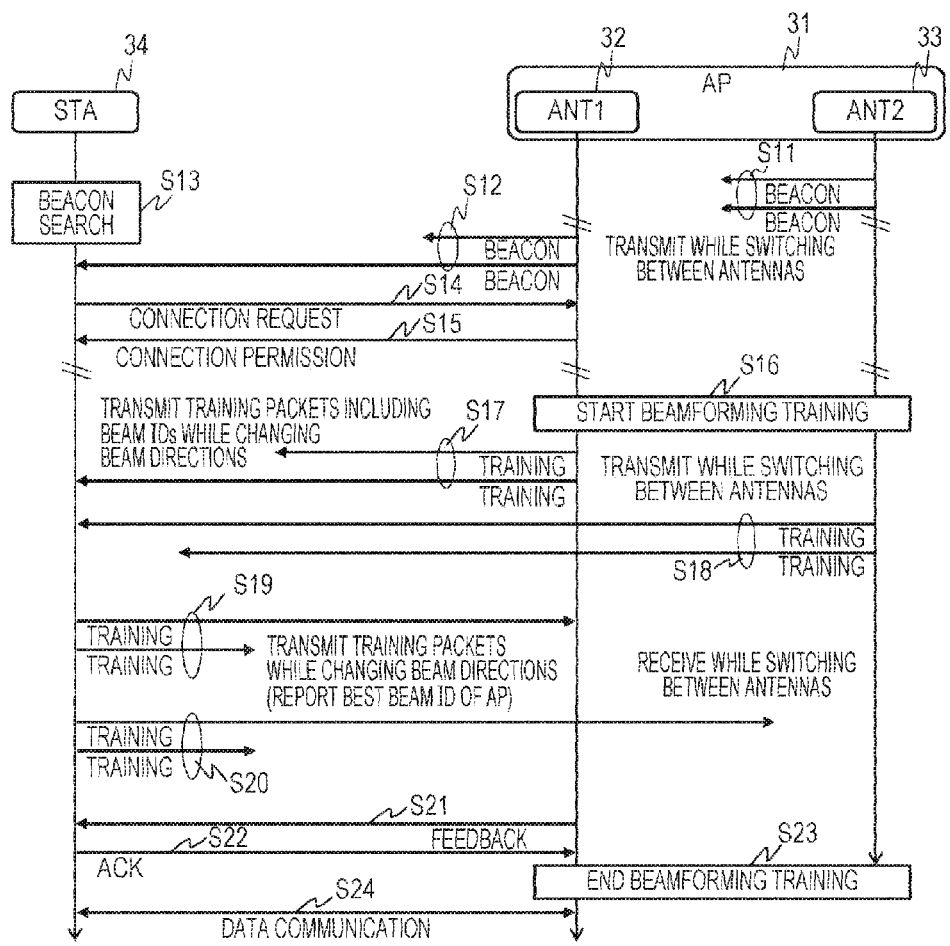
FIG. 4 illustrates an example of a connection and beamforming training between a terminal apparatus and the base station apparatus including the plurality of antennas.

FIG. 4 is a sequence diagram illustrating an example of a connection and beamforming training between the STA 34 and the AP 31 including the plurality of antennas 32 and 33. In FIG. 4, S represents "step".

The AP 31 periodically transmits a beacon. The AP 31 alternately switches between the two antennas, namely, the antenna 32 (the ANT1) and the antenna 33 (the ANT2), to perform beacon transmission (S11) by using beams of the ANT2 and beacon transmission (S12) by using beams of the ANT1, The STA 34, which desires to establish a connection with the AP 31, searches for a beacon from the AP 31 (S13). Upon successful receipt of a beacon from the AP 31, the STA 34 sends a connection request (S14).

Upon receipt of the connection request, the AP 31 permits connection when the STA 34 is successfully authenticated, and sends connection permission to the STA 34 (S15).

When a connection with the STA 34 is established, the AP 31 starts beamforming training (S16).

Figure 5:
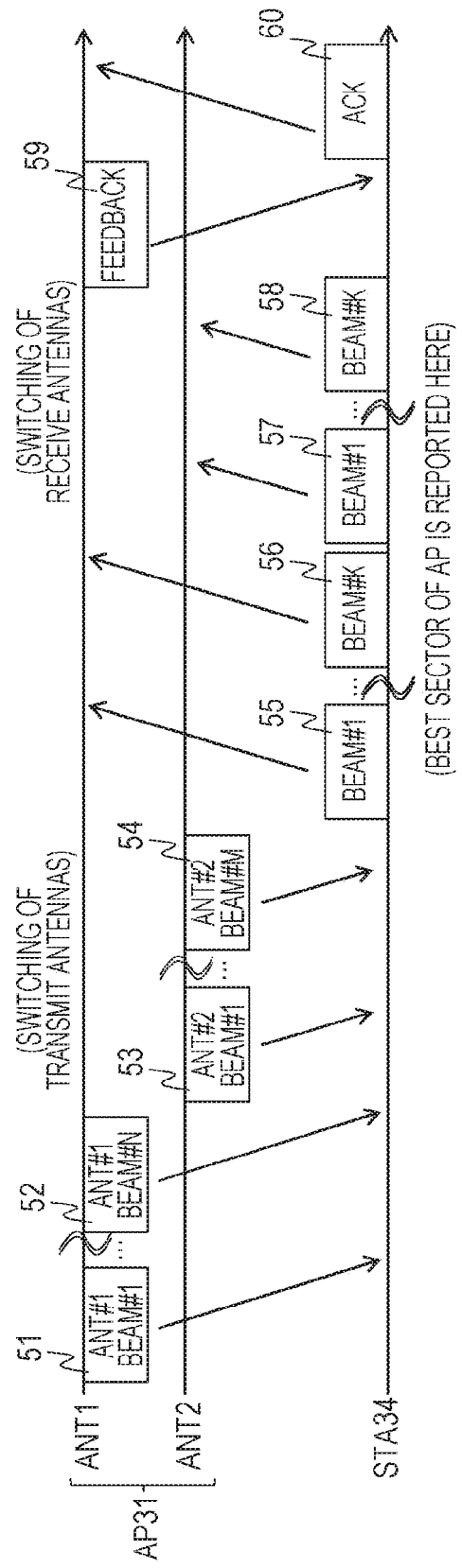
FIG. 5 illustrates an example of timing when the base station apparatus including the plurality of antennas performs beamforming training.

FIG. 5 is a timing chart illustrating an example of timing when the AP 31 including the plurality of antennas 32 and 33 performs beamforming training. In FIG. 5, training frames 51 and 52, which are transmitted from the ANT1 of the AP 31, training frames 53 and 54, which are transmitted from the ANT2 of the AP 31, training frames 55, 56, 57, and 58, which are transmitted from the STA 34, a feedback frame 59, which is transmitted from the AP 31, and an ACK frame 60, which is transmitted from the STA 34, are illustrated.

The AP 31 can use N beams of the ANT1 and M beams of the ANT2. Thus, the AP 31 switches the N beams and the M beams in sequence and transmits (N+M) training frames (the training frames 51 to 54) (S17 and S18 in FIG. 4). The AP 31 assigns the antenna ID 1 and the beam IDs 1 to N to frames transmitted from the ANT1, and assigns the antenna ID 2 and the beam IDs 1 to M to frames transmitted from the ANT2. The AP 31 transmits the training frame 51 (antenna ID=1 and beam ID=1) by using the beam 35 of the ANT1, the training frame 52 (antenna ID=1 and beam ID=N) by using the beam 37, the training frame 53 (antenna ID=2 and beam ID=1) by using the beam 38 of the ANT2, and the training frame 54 (antenna ID=2 and beam ID=M) by using the beam 40.

The STA 34 receives training frames from the AP 31 and determines the best sector of the AP 31. After detecting the end of the training frame transmission period, then, the STA 34 transmits the training frames 55, 56, etc. (S19) and then transmits the training frames 57, 58, etc. (S20). Using the training frames 55, 56, 57, 58, etc., which include information on the best sector (best beam ID) of the AP 31, the STA 34 report the best sector (best beam ID) of the AP 31 to the AP 31.

The AP 31 receives training frames from the STA 34 by switching between the ANT1 and the ANT2. Since the AP 31 is a single AP, it is difficult to simultaneously receive the training frames transmitted in S19 and S20. Thus, the beamforming training illustrated in FIG. 4 requires two transmissions of training frames in S19 and S20, resulting in an increase in the time required for the beamforming training.

Upon correct receipt of a training frame from the STA 34, the AP 31 stores the reception quality of the received training frame and the information included in the training frame, namely, the information on the beam ID and the number of remaining frames. Further, the AP 31 identifies which beam among the beams of the ANT1 and the ANT2 will be received with the best quality when communication with the STA 34 is performed, by using the beam ID reported by the STA 34, which indicates the best sector of the AP 31. The AP 31 uses the identified antenna beam for subsequent communication with the STA 34.

After detecting the end of the training frame transmission period from the STA 34, the AP 31 determines the best sector of the STA 34 and reports the best sector to the STA 34 by using the feedback frame 59 (S21). In the example illustrated in FIG. 5, the best sector of the AP 31 is a beam of the ANT1, and the AP 31 transmits the feedback frame 59 from the ANT1.

Upon receipt of the feedback frame 59, the STA 34 identifies a beam ID to provide the best reception quality when transmission is performed from the STA 34 to the AP 31, by using the reported beam ID which indicates the best sector of the STA 34, and uses the beam with the identified beam ID for subsequent communication with the AP 31.

The STA 34 reports a response indicating a receipt of the feedback frame 59 to the AP 31 by using the ACK frame 60 (S22). Thus, the beamforming training ends (S23).

The AP 31 and the STA 34 perform subsequent data communication by using the determined beams (S24).

In a millimeter-wave network, as described above, a simple increase in the number of beams that can be switched to increase the communication-available area leads to an increase in circuit scale or cost and also increases the time required for training. Specifically, the time required for a base station apparatus to perform training to transmit and receive training frames increases in accordance with the number of antennas multiplied by the number of beams per antenna.

In addition, it is difficult for other terminals to communicate with the base station apparatus during the beamforming training.

Accordingly, an embodiment of the present disclosure provides beamforming training in a millimeter-wave network in which a plurality of antennas are distributed so as to cover an area from various angles to increase the communication-available area, in which the time for beamforming training can be reduced.

An embodiment of the present disclosure will be described in detail hereinafter with reference to the drawings.

2. Embodiment 2-1. Configuration of Communication System

Figure 6:
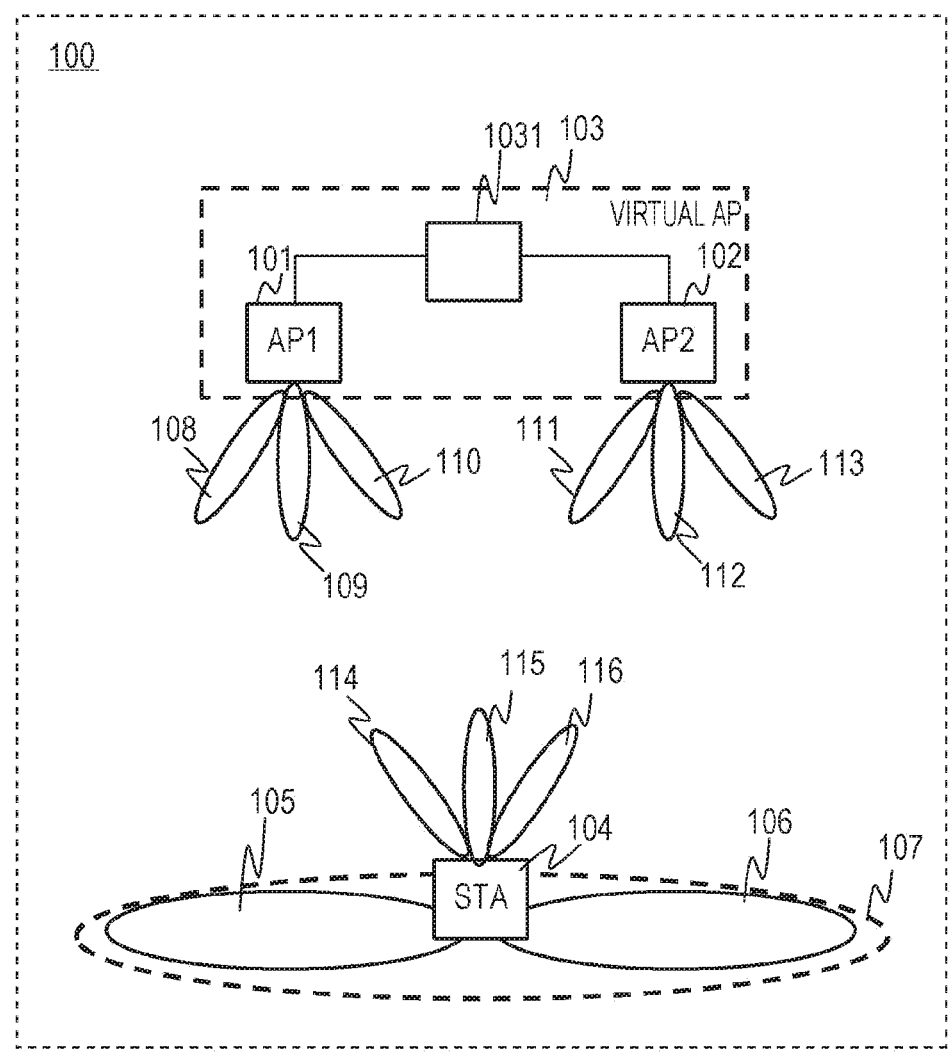
FIG. 6 illustrates an example configuration of a millimeter-wave communication system according to an embodiment.

FIG. 6 illustrates an example configuration of a millimeter-wave communication system 100 according to this embodiment. In the millimeter-wave communication system 100 according to this embodiment, a plurality of APs cooperate with each other to form a virtual AP. Specifically, a base station apparatus 101 (AP1) and a base station apparatus 102 (AP2) are connected to each other via a control device 1031 to form a virtual base station apparatus (virtual AP) 103. The AP1 covers a communication area 105 by using beams 108 to 110, and the AP2 covers a communication area 106 by using beams 111 to 113. The virtual AP 103 is capable of covering a communication area 107 having a wider range in which the communication areas 105 and 106 are combined. A terminal (STA) 104 establishes a connection with the virtual AP 103 by using beams 114 to 116.

2-2. Transmission of Training Frames Starting from Virtual AP

Figure 7:
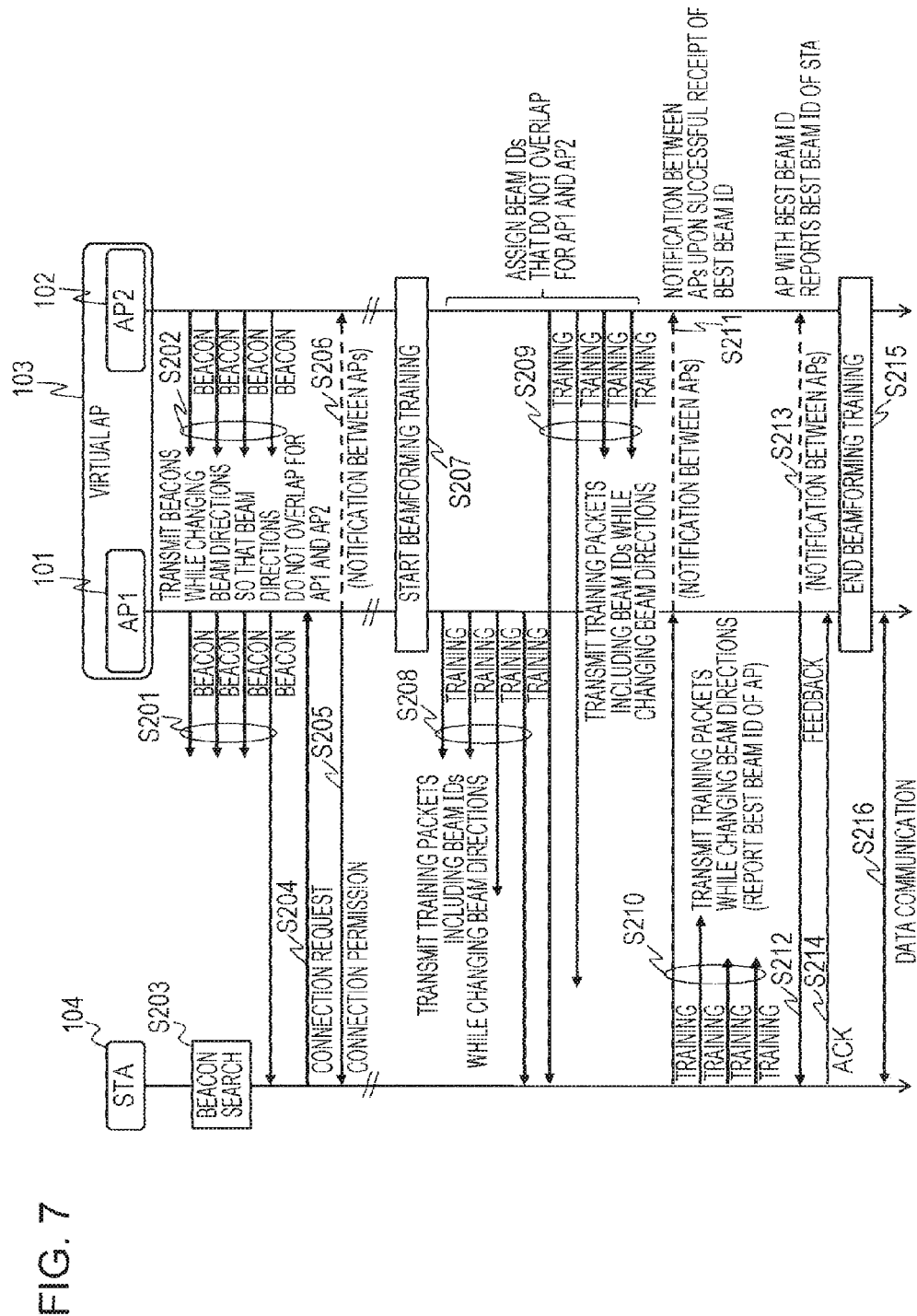
FIG. 7 illustrates an example of a connection and beamforming training between a virtual base station apparatus and a terminal apparatus.

FIG. 7 is a sequence diagram illustrating an example of a connection and beamforming training between the virtual AP 103 and the STA 104. In FIG. 7, S represents "step".

The virtual AP 103 periodically transmits a beacon. At this time, the virtual AP 103 selects a beam pair that may not cause interference due to an overlap of the beam direction of a beacon from the AP1 and the beam direction of a beacon from the AP2, and performs beacon transmission from the AP1 (S201) and beacon transmission from the AP2 (S202). For example, when the AP1 selects the beam 110, the AP2 does not select the beam 111.

The STA 104, which desires to establish a connection with the virtual AP 103, searches for a beacon from the virtual AP 103 (S203). Upon successful receipt of a beacon from the virtual AP 103, the STA 104 sends a connection request (S204).

Upon receipt of the connection request, the virtual AP 103 permits connection after the STA 104 has successfully been authenticated, and sends connection permission to the STA 104 (S205). In the example illustrated in FIG. 7, the AP1 has successfully received the connection request sent in S204, and a communication unit of the AP1 notifies a communication unit of the AP2 that a connection request has been sent from the STA 104 and that connection permission has been sent to the STA 104 (notification between APs) (S206).

After a connection with the STA 104 has been established, the virtual AP 103 starts beamforming training (S207).

Figure 8:
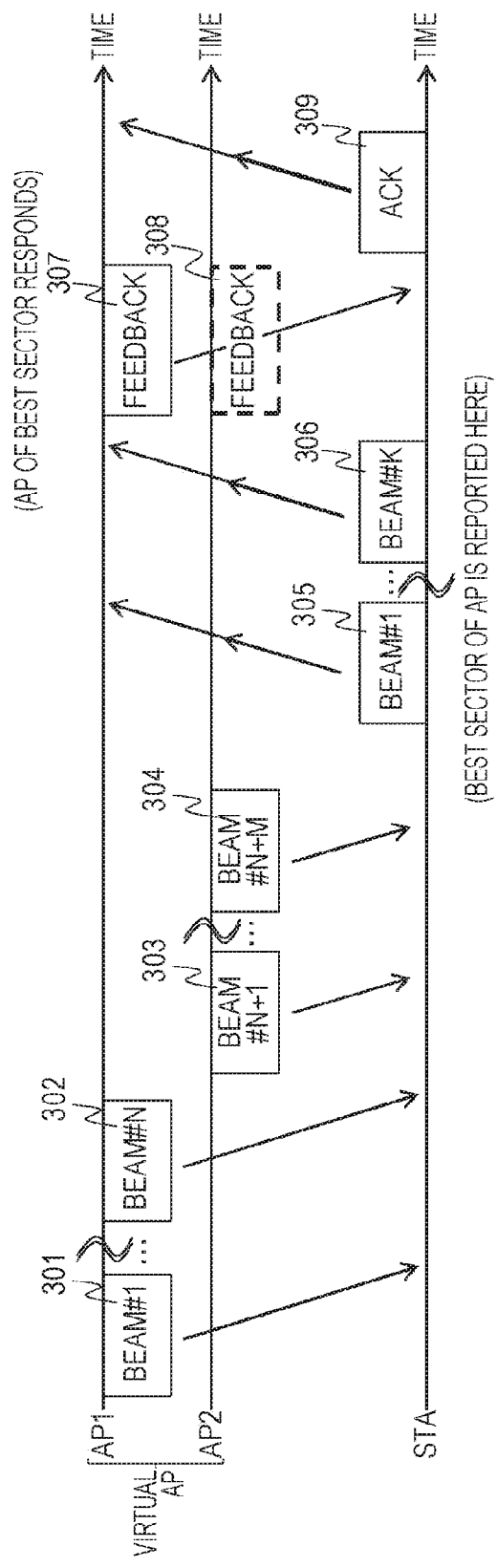
FIG. 8 illustrates an example of timing when the virtual base station apparatus performs beamforming training.

FIG. 8 is a timing chart illustrating an example of timing when the virtual AP 103 performs beamforming training. In FIG. 8, training frames 301, 302, 303, and 304, which are transmitted from the virtual AP 103, training frames 305 and 306, which are transmitted from the STA 104, feedback frames 307 and 308, which are transmitted from the virtual AP 103, and an ACK frame 309, which is transmitted from the STA 104, are illustrated.

The virtual AP 103 can use N beams of a transmitter of the AP1 and M beams of a transmitter of the AP2. Thus, the virtual AP 103 switches the N beams and the M beams in sequence and transmits (N+M) training frames (the training frames 301 to 304) from the transmitter of the AP1 and the transmitter of the AP2 (S208 and S209 in FIG. 7). The virtual AP 103 assigns the beam IDs 1 to N to frames transmitted from the AP1 and assigns the beam IDs (N+1) to (N+M) to frames transmitted from the AP2 so as not to cause the beam IDs to overlap. The virtual AP 103 transmits the training frame 301 (beam ID=1) by using the beam 108 of the AP1, transmits the training frame 302 (beam ID=N) by using the beam 110 of the AP1, transmits the training frame 303 (beam ID=N+1) by using the beam 111 of the AP2, and transmits the training frame 304 (beam ID=N+M) by using the beam 113 of the AP2.

The STA 104 receives training frames from the virtual AP 103 and determines the best sector of the virtual AP 103. After detecting the end of the training frame transmission period, then, a transmitter of the STA 104 transmits the training frames 305, 306, etc. (S210). Using the training frames 305, 306, etc., which include information on the best sector (best beam ID) of the virtual AP 103, the STA 104 reports the best sector (best beam ID) of the virtual AP 103 to the virtual AP 103.

In the virtual AP 103, a receiver of the AP1 and a receiver of the AP2 simultaneously receive training frames from the STA 104. The simultaneous receipt is possible because the AP1 and the AP2 are each an independent AR Upon correct receipt of a training frame from the STA 104, each of the AP1 and the AP2 stores the reception quality of the received training frame and the information included in the training frame, namely, the information on the beam ID and the number of remaining frames. In addition, the virtual AP 103 shares the stored information between the APs (notification between APs) by using the communication unit of the AP1 and the communication unit of the AP2 (S211). Further, the virtual AP 103 identifies which beam among the beams of the AP1 and AP2 will be received with the best quality when communication with the STA 104 is performed, by using the beam ID reported by the STA 104, which indicates the best sector of the virtual AP 103, and uses the identified AP beam for subsequent communication with the STA 104.

After detecting the end of the training frame transmission period from the STA 104, the virtual AP 103 determines the best sector of the STA 104 and reports the best sector to the STA 104 from the transmitter of the AP1 by using the feedback frame 307 or 308 (S212). At this time, the virtual AP 103 shares the best sector of the STA 104 between the APs (the communication unit of the AP1 and the communication unit of the AP2) (S213). When the best sector of the virtual AP 103 is a beam of the AP1, the transmitter of the AP1 transmits the feedback frame 307. When the best sector of the virtual AP 103 is a beam of the AP2, the transmitter of the AP2 transmits the feedback frame 308. In the example illustrated in FIG. 8, the transmitter of the AP1 transmits the feedback frame 307.

A receiver of the STA 104 receives the feedback frame 307, and the STA 104 identifies a beam ID to provide the best reception quality when transmission is performed from the transmitter of the STA 104 to the virtual AP 103, by using the reported beam ID which indicates the best sector of the STA 104, and uses the beam with the identified beam ID for subsequent communication with the virtual AP 103.

The transmitter of the STA 104 reports a response indicating a receipt of the feedback frame 307 to the virtual AP 103 by using the ACK frame 309 (S214). Thus, the beamforming training ends (S215).

The virtual AP 103 and the STA 104 perform subsequent data communication by using the determined beams (S216).

As described above, the beamforming training illustrated in FIG. 7 and FIG. 8 using the configuration illustrated in FIG. 6 can reduce the number of training frames that are transmitted from the STA 104 to the virtual AP 103 and reduce the time required for the beamforming training, compared with the beamforming training illustrated in FIG. 4 and FIG. 5 using the configuration illustrated in FIG. 3.

Specifically, in the configuration illustrated in FIG. 3, as indicated by S19 and S20 in FIG. 4 and the training frames 55, 56, 57, and 58 in FIG. 5, it is difficult to perform simultaneous transmission or reception by using the antenna 32 (ANT1) and the antenna 33 (ANT2), and thus the AP 31 requires switching between the antenna 32 (ANT1) and the antenna 33 (ANT2). The STA 34 needs to transmit two sets of training frames. In contrast, the configuration illustrated in FIG. 6 enables simultaneous transmission or reception using the AP1 and the AP2. Thus, as indicated by S210 in FIG. 7 and the training frames 305 and 306 in FIG. 8, the STA 104 is only required to transmit a set of training frames to the virtual AP 103.

2-3. Transmission of Training Frames Starting from STA

In Section 2-2, transmission of training frames starting from a virtual AP has been described. Instead of this, transmission of training frames starting from a STA will be discussed hereinbelow. This transmission enables a further reduction in the time required for beamforming training, compared with the method in Section 2-2.

Figure 9:
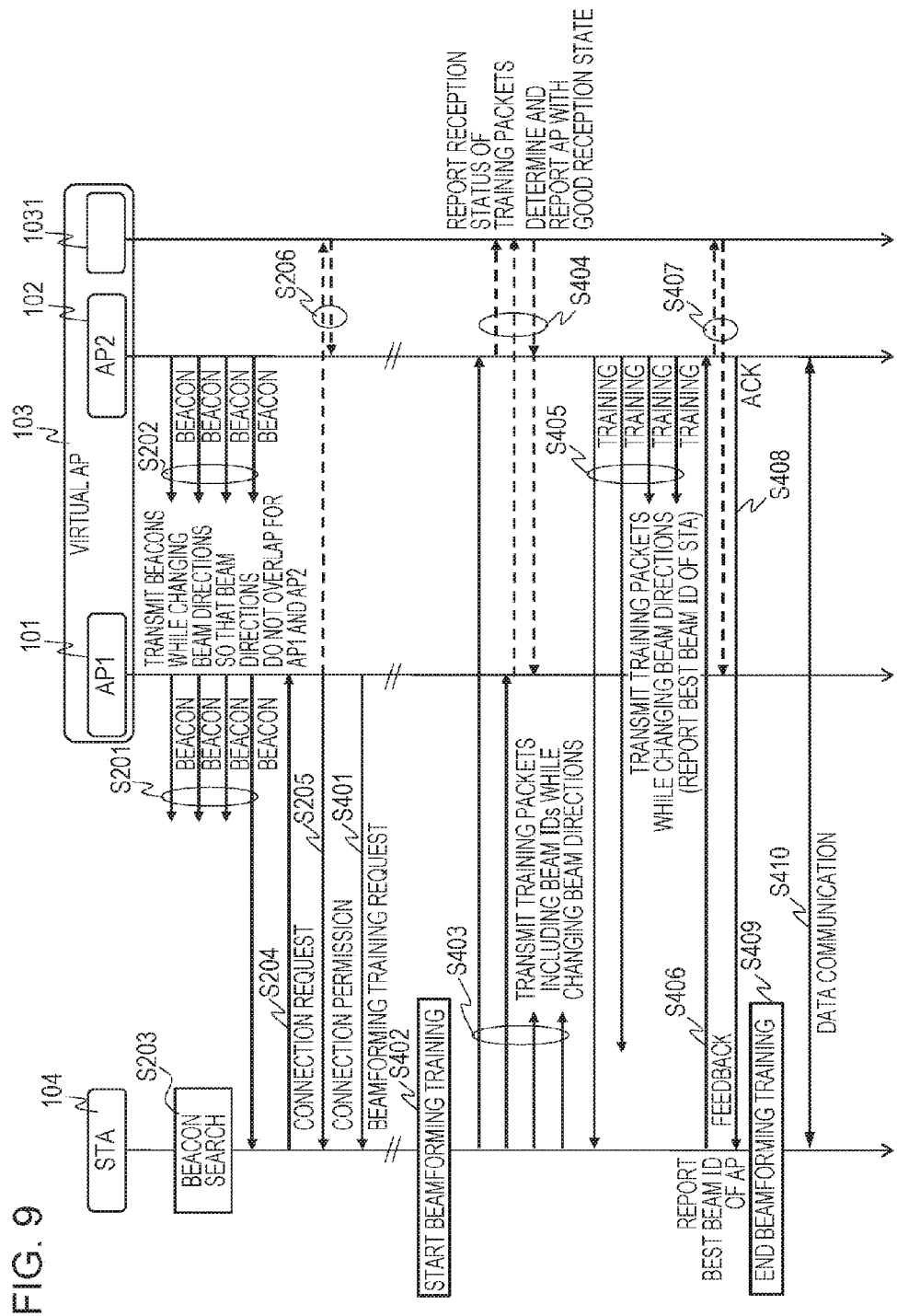
FIG. 9 illustrates an example of a connection and beamforming training between the virtual base station apparatus and the terminal apparatus.

FIG. 9 is a sequence diagram illustrating an example of a connection and beamforming training between the virtual AP 103 and the STA 104. In FIG. 9, 5 represents "step". The steps until the STA 104 establishes a connection with the virtual AP 103 are the same as those in S201 to S206 in FIG. 7 and are not described herein.

After a connection with the STA 104 has been established, the virtual AP 103 transmits a beamforming training request frame from the transmitter of the AP1 to the STA 104 (S401). Upon receipt of the beamforming training request frame, the STA 104 starts beamforming training (S402).

Figure 10:
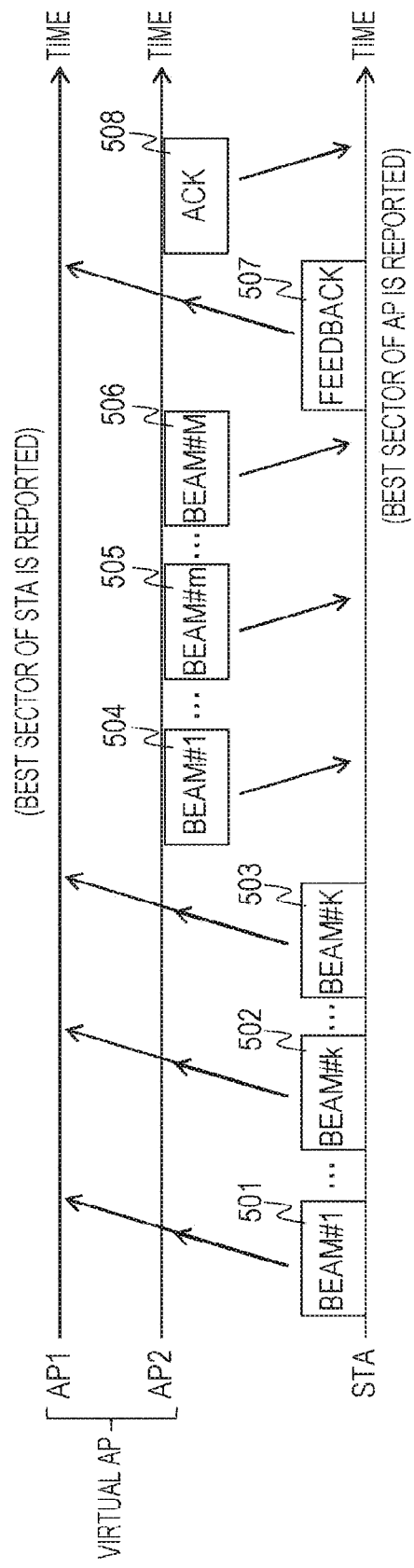
FIG. 10 illustrates an example of timing when the terminal apparatus performs beamforming training.

FIG. 10 is a timing chart illustrating an example of timing when the STA 104 performs beamforming training. In FIG. 10, training frames 501, 502, and 503, which are transmitted from the STA 104, training frames 504, 505, and 506, which are transmitted from the virtual AP 103, a feedback frame 507, which is transmitted from the STA 104, and an ACK frame 508, which is transmitted from the virtual AP 103, are illustrated.

The transmitter of the STA 104 transmits the training frames 501 to 503 by switching beams (S403).

In the virtual AP 103, the receiver of the AP1 and the receiver of the AP2 simultaneously receive training frames transmitted from the STA 104. Upon correct receipt of a training frame from the STA 104, each of the AP1 and the AP2 stores the reception quality of the received training frame and the information included in the training frame, namely, the information on the beam ID and the number of remaining frames. In addition, the virtual AP 103 shares the stored information between the APs (notification between APs) by using the communication unit of the AP1 and the communication unit of the AP2 (S404). The share of the information between the APs and the determination of an AP having a good reception state are performed via the control device 1031.

After detecting the end of the training frame transmission period from the STA 104, the virtual AP 103 determines best sectors of the STA 104 having the best reception qualities between the AP1 and the STA 104 and between the AP2 and the STA 104. At this time, the virtual AP 103 also determines which of the AP1 and the AP2 has a better reception state, and selects an AP that is to return a response to the STA 104. In the example illustrated in FIG. 9 and FIG. 10, the AP2 is selected.

The virtual AP 103 transmits the training frames 504 to 506 from the transmitter of the AP2 (S405) and reports the best sector of the STA 104 to the STA 104 by using the training frames 504 to 506.

When the receiver of the STA 104 receives training frames from the virtual AP 103, the STA 104 determines the best sector of the virtual AP 103. Upon detection of the end of the training frame transmission period, the STA 104 transmits the feedback frame 507 from the transmitter of the STA 104 to report the best sector of the virtual AP 103 (the AP2) (S406).

The receiver of the AP2 receives the feedback frame 507, and the virtual AP 103 identifies a beam ID to provide the best reception quality when transmission is performed from the virtual AP 103 (the AP2) to the STA 104, by using the reported beam ID which indicates the best sector of the virtual AP 103 (the AP2), and uses the beam with the identified beam ID for subsequent communication with the STA 104. This information is shared between the APs via the control device 1031 by using the communication unit of the AP1 and the communication unit of the AP2 (S407).

The virtual AP 103 reports a response indicating a receipt of the feedback frame 507 to the STA 104 from the transmitter of the AP2 by using the ACK frame 508 (S408). Thus, the beamforming training ends (S409).

The virtual AP 103 and the STA 104 perform subsequent data communication by using the determined beams (S410).

As described above, the beamforming training illustrated in FIG. 9 and Fig, 10 using the configuration illustrated in FIG. 6 can reduce the number of training frames that are transmitted from the virtual AP 103 to the STA 104 and reduce the time for the beamforming training, compared with the beamforming training illustrated in FIG. 7 and FIG. 8 using the configuration illustrated in FIG. 6.

That is, beamforming training for configuring the virtual AP 103 and transmitting training frames starting from the STA 104 can reduce the number of training frames that are transmitted from the virtual AP 103 to the STA 104 and reduce the time for beamforming training, compared with that for configuring the virtual AP 103 and transmitting training frames starting from the virtual AP 103.

Specifically, transmission of training frames starting from the STA 104 allows the virtual AP 103 to identify which of the AP1 and the AP2 has a better reception state. Thus, as indicated by S405 in FIG. 9 and the training frames 504 to 506 in FIG. 10, the virtual AP 103 is only required to transmit a set of training frames from an AP having a good reception state. This enables a reduction in the number of training frames that are transmitted to the STA 104 and a further reduction in the time required for beamforming training, compared with, as indicated by S208 and 5209 in FIG. 7 and the training frames 303 to 306 in FIG. 8, transmission of two sets of training frames from the AP1 and the AP2.

Accordingly, this embodiment enables a reduction in the time required for beamforming training even if a plurality of base station apparatuses are arranged in a distributed manner so as to cover an area from various angles to increase the communication-available area of a base station apparatus. Thus, the use efficiency of a high-directivity millimeter-wave network with a small coverage can be improved, and an increase in system capacity is achievable.

While an embodiment has been described with reference to the drawings, it is to be understood that the present disclosure is not limited to the illustrated examples. It is apparent that a person skilled in the art can arrive at various changes or modifications within the scope of the appended claims, and it is understood that such changes or modifications also fall within the technical scope of the present disclosure. In addition, any combination of elements in the embodiment described above may be used without departing from the gist of the disclosure.

In the embodiment described above, the control device 1031 is disposed to allow the AP1 and the AP2 to cooperate with each other to form the virtual AP 103. In essence, it is desirable to share information between the AP1 and the AP2. For example, one of the AP1 and the AP2 may be included in either the AP1 or the AP2 so that the AP1 and the AP2 have a master-slave relationship, thereby forming a virtual AP.

In the embodiment described above, furthermore, two APs form a virtual AP. It is needless to say that three or more APs may be used.

In the embodiment described above, the present disclosure is implemented by hardware, by way of example. However, the present disclosure can be realized by software, hardware, or software in cooperation with hardware.

Furthermore, each functional block used in the description of each embodiment described above can be partly or entirely realized by an LSI such as an integrated circuit, and each process described in the each embodiment may be controlled partly or entirely by the same LSI or a combination of LSI& The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

In addition, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

Additionally, if future integrated circuit technology replaces LSIs as a result of the advancement of semiconductor technology or other derivative technology, the functional blocks could be integrated using the future integrated circuit technology. Biotechnology can also be applied.

3. Summary of Embodiment

A virtual base station apparatus according to an aspect of the present disclosure is a virtual base station apparatus for performing millimeter-wave band communication with a terminal apparatus by using beamforming. The virtual base station apparatus includes a plurality of base station apparatuses. Each of the plurality of base station apparatuses includes a transmitter that transmits a plurality of first training frames to the terminal apparatus, a receiver that receives a plurality of second training frames transmitted from the terminal apparatus, and a communication device that communicates beamforming control information among the plurality of base station apparatuses. The plurality of base station apparatuses include a first base station apparatus. The receiver of the first base station apparatus receives the plurality of second training frames, the plurality of second training frames including information on a first training frame having a best reception quality among the plurality of first training frames received by the terminal apparatus. The communication device of the first base station apparatus transmits the information on the first training frame having the best reception quality, as the beamforming control information, to other base station apparatuses of the plurality of base station apparatuses. The transmitter of the first base station apparatus transmits a third frame to the terminal apparatus, the third frame including information on a second training frame having a best reception quality among the plurality of received second training frames.

In the virtual base station apparatus according to the aspect of the present disclosure, the communication device of the first base station apparatus may transmit the information on the second training frame having the best reception quality among the plurality of second training frames to other base station apparatuses of the plurality of base station apparatuses.

In the virtual base station apparatus according to the aspect of the present disclosure, the transmitter of each of the plurality of base station apparatuses may transmit the plurality of first training frames in time periods that are different among the plurality of base station apparatuses.

In the virtual base station apparatus according to the aspect of the present disclosure, the transmitter of each of the plurality of base station apparatuses may transmit the plurality of first training frames after the receiver of one of the plurality of base station apparatuses has received a connection request signal from the terminal apparatus.

The virtual base station apparatus according to the aspect of the present disclosure may include a control device. The communication device of the first base station apparatus may transmit the information on the first training frame having the best reception quality to the control device, and the control device may transmit information on the first base station apparatus to the other base station apparatuses.

A virtual base station apparatus according to an aspect of the present disclosure is a virtual base station apparatus for performing millimeter-wave band communication with a terminal apparatus by using beamforming. The virtual base station apparatus includes a plurality of base station apparatuses. Each of the plurality of base station apparatuses includes a transmitter that transmits a first frame to the terminal apparatus, the first frame being a frame for requesting a start of beamforming training, a receiver that receives a plurality of first training frames transmitted from the terminal apparatus in accordance with the first frame, and a communication device that communicates beamforming control information among the plurality of base station apparatuses. The plurality of base station apparatuses include a first base station apparatus. The receiver of the first base station apparatus receives a first training frame having a best reception quality among the plurality of received first training frames. The communication device of the first base station apparatus transmits information on the first training frame having the best reception quality to other base station apparatuses of the plurality of base station apparatuses. The transmitter of the first base station apparatus transmits a plurality of second training frames to the terminal apparatus, the plurality of second training frames including the information on the first training frame having the best reception quality. The receiver of the first base station apparatus receives a second frame from the terminal apparatus, the second frame including information on a second training frame having a best reception quality among the plurality of second training frames received by the terminal apparatus.

The virtual base station apparatus according to the aspect of the present disclosure may include a control device. The communication device of the first base station apparatus may transmit the information on the first training frame having the best reception quality to the control device, and the control device may transmit the information on the first base station apparatus to the other base station apparatuses.

In the virtual base station apparatus according to the aspect of the present disclosure, the communication device of the first base station apparatus may transmit the information on the second training frame having the best reception quality to other base station apparatuses of the plurality of base station apparatuses.

A communication method according to an aspect of the present disclosure is a communication method performed by a virtual base station apparatus including a plurality of base station apparatuses, for performing millimeter-wave band communication with a terminal apparatus by using beamforming. The communication method includes transmitting, by each of the plurality of base station apparatuses, a plurality of first training frames to the terminal apparatus; receiving, by each of the plurality of base station apparatuses, a plurality of second training frames transmitted from the terminal apparatus; communicating, by each of the plurality of base station apparatuses, beamforming control information among the plurality of base station apparatuses; receiving, by a first base station apparatus included in the plurality of base station apparatuses, the plurality of second training frames, the plurality of second training frames including information on a first training frame having a best reception quality among the plurality of first training frames received by the terminal apparatus; transmitting, by the first base station apparatus, the information on the first training frame having the best reception quality, as the beamforming control information, to other base station apparatuses of the plurality of base station apparatuses; and transmitting, by the first base station apparatus, a third frame to the terminal apparatus, the third frame including information on a second training frame having a best reception quality among the plurality of received second training frames.

The communication method according to the aspect of the present disclosure may include transmitting, by the first base station apparatus, the information on the second training frame having the best reception quality among the plurality of second training frames to other base station apparatuses of the plurality of base station apparatuses.

The present disclosure is suitable for use in a wireless communication system that performs millimeter-wave band communication using beamforming.

What is claimed is:

1. A virtual base station apparatus for performing millimeter-wave band communication with a terminal apparatus by using beamforming, comprising:
   a plurality of base station apparatuses,
   each of the plurality of base station apparatuses including
      a transmitter, which, in operation, transmits first training frames of a plurality of first training frames to the terminal apparatus;
      a receiver, which, in operation, receives second training frames generated and transmitted by the terminal apparatus; and
      a communication device, which, in operation, communicates beamforming control information among the plurality of base station apparatuses, wherein
   the plurality of first training frames are transmitted by the base station apparatuses to the terminal apparatus during a first training frame transmission period,
   a plurality of second training frames are received by the base station apparatuses during a second training frame transmission period after the first training frame transmission period and include information identifying a first training frame identified by the terminal apparatus as having a best reception quality among the plurality of first training frames received by the terminal apparatus, the first training frame having the best reception quality among the plurality of first training frames being associated with a first base station apparatus of the plurality of base station apparatuses,
   the communication device of the first base station apparatus, in operation, transmits beamforming control information identifying the first training frame having the best reception quality to other base station apparatuses of the plurality of base station apparatuses, and
   the transmitter of the first base station apparatus, in operation, transmits a third frame to the terminal apparatus, the third frame including information on a second training frame having a best reception quality among the plurality of received second training frames.

2. The virtual base station apparatus according to claim 1, wherein
   the communication device of the first base station apparatus, in operation, transmits information identifying the second training frame having the best reception quality among the plurality of second training frames to other base station apparatuses of the plurality of base station apparatuses.

3. The virtual base station apparatus according to claim 1, wherein
   the transmitter of each of the plurality of base station apparatuses, in operation, transmits the plurality of first training frames in time periods within the first training frame transmission period that are different among the plurality of base station apparatuses.

4. The virtual base station apparatus according to claim 1, wherein
   the transmitter of each of the plurality of base station apparatuses, in operation, transmits respective first training frames of the plurality of first training frames after the receiver of one of the plurality of base station apparatuses has received a connection request signal from the terminal apparatus.

5. The virtual base station apparatus according to claim 1, comprising a control device, wherein
   the communication device of the first base station apparatus, in operation, transmits information identifying the first training frame having the best reception quality to the control device, and
   the control device, in operation, transmits information on the first base station apparatus to the other base station apparatuses.

6. A virtual base station apparatus for performing millimeter-wave band communication with a terminal apparatus by using beamforming, comprising:
   a plurality of base station apparatuses,
   each of the plurality of base station apparatuses including
      a transmitter, which, in operation, transmits requests to start beamforming training to the terminal apparatus;

a receiver, which, in operation, receives first training frames transmitted from the terminal apparatus in accordance with requests to start beamform training; and a communication device, which, in operation, communicates beamforming control information among the plurality of base station apparatuses, wherein the plurality of bases station apparatuses receive a plurality of first training frames from the terminal apparatus during a first training frame period, the plurality of base station apparatuses include a first base station apparatus, the receiver of the first base station apparatus, in operation, receives a first training frame having a best reception quality among the plurality of first training frames received by the plurality of base station apparatuses, the communication device of the first base station apparatus in operation, transmits information on the first training frame having the best reception quality to other base station apparatuses of the plurality of base station apparatuses, the plurality of bases station apparatuses transmit a plurality of second training frames to the terminal apparatus during a second training frame period, the plurality of second training frames including the information on the first training frame having the best reception quality, and the receiver of the first base station apparatus, in operation, receives information transmitted by the terminal apparatus identifying a second training frame having a best reception quality among the plurality of second training frames received by the terminal apparatus.

7. The virtual base station apparatus according to claim 6, comprising a control device, wherein the communication device of the first base station apparatus, in operation, transmits the information on the first training frame having the best quality to the control device, and the control device, in operation, transmits information on the first base station apparatus to the other base station apparatuses.

8. The virtual base station apparatus according to claim 6, wherein the communication device of the first base station apparatus, in operation, transmits the information on the second training frame having the best reception quality to other base station apparatuses of the plurality of base station apparatuses.

9. A communication method performed by a virtual base station apparatus including a plurality of base station apparatuses, for performing millimeter-wave band communication with a terminal apparatus by using beamforming, the communication method comprising:

transmitting, by each of the plurality of base station apparatuses in a first training frame period, respective first training frames of a plurality of first training frames to the terminal apparatus;

receiving, by each of the plurality of base station apparatuses, a plurality of second training frames transmitted from the terminal apparatus in a second training frame period, the plurality of second training frames including information identifying a first training frame having a best reception quality among the plurality of first training frames received by the terminal apparatus, the first training frame having the best reception quality being associated with a first base station apparatus of the plurality of base station apparatuses;

transmitting, by the first base station apparatus, beamforming control information including information on the first training frame having the best reception quality to other base station apparatuses of the plurality of base station apparatuses; and transmitting, by the first base station apparatus to the terminal apparatus, information on a second training frame having a best reception quality among the plurality of received second training frames.

10. The communication method according to claim 9, comprising transmitting, by the first base station apparatus, the information on the second training frame having the best reception quality among the plurality of second training frames to other base station apparatuses of the plurality of base station apparatuses.

* * * * *